(12) United States Patent
Endo

(10) Patent No.: US 7,598,193 B2
(45) Date of Patent: *Oct. 6, 2009

(54) OPTICAL GLASS, GLASS GOB FOR PRESS-MOLDING, OPTICAL PART, PROCESS FOR PRODUCING GLASS SHAPED MATERIAL AND PROCESS FOR PRODUCING OPTICAL PART

(75) Inventor: Michio Endo, Utsunomiya (JP)

(73) Assignee: Hoya Corporation, Tokyo (JP)

( * ) Notice: Subject to any disclaimer, the term of this patent is extended or adjusted under 35 U.S.C. 154(b) by 572 days.

This patent is subject to a terminal disclaimer.

(21) Appl. No.: 11/357,406

(22) Filed: Feb. 21, 2006

(65) Prior Publication Data

US 2006/0189473 A1    Aug. 24, 2006

(30) Foreign Application Priority Data

Feb. 21, 2005    (JP)    ............................... 2005-043881

(51) Int. Cl.
*C03C 3/068*    (2006.01)
(52) U.S. Cl. .......................................... 501/78; 501/79
(58) Field of Classification Search ................... 501/78, 501/79
See application file for complete search history.

(56) References Cited

U.S. PATENT DOCUMENTS 4,128,432 A * 12/1978 Komorita et al. .............. 501/42

6,912,093 B2 * 6/2005 Endo ........................... 359/642
2004/0220041 A1 * 11/2004 Isowaki et al. ................. 501/78
2006/0105900 A1 * 5/2006 Kasuga et al. .................. 501/78
2008/0194395 A1 * 8/2008 Endo ........................... 501/78

FOREIGN PATENT DOCUMENTS

| DE | 42 22 322 C1 | 12/1993 |
| EP | 1 433 757 A1 | 6/2004 |
| JP | 3-5340 A | 1/1991 |
| JP | 6-56462 | 3/1994 |
| JP | 6-87628 | 3/1994 |

* cited by examiner

*Primary Examiner*—Jerry Lorengo
*Assistant Examiner*—Elizabeth A Bolden
(74) *Attorney, Agent, or Firm*—Nixon & Vanderhye P.C.

(57) ABSTRACT

An optical glass having a high light transmittance, a high refractive index and excellent production stability, which contains at least one of CaO and SrO together with $SiO_2$, $B_2O_3$, $La_2O_3$, $Nb_2O_5$, $TiO_2$ and BaO, having a composition that substantially contains, by weight %, 1 to 18% of $SiO_2$, 3 to 24% of $B_2O_3$, provided that the ratio of content of $B_2O_3$ to the content of $SiO_2$ ($B_2O_3/SiO_2$) is over 1, 10 to 50% of $La_2O_3$, 1 to 30% of $Nb_2O_5$, 1 to 30% of $TiO_2$, over 6% but not more than 25% of BaO, less than 7% of CaO, 6% or less of SrO, 0 to 13% of MgO, provided that the total content of BaO, CaO, SrO and MgO is 40% or less, 0 to 15% of ZnO, 0 to 15% of $ZrO_2$, 0 to 10% of $Al_2O_3$, 0 to 20% of $Gd_2O_3$, 0% or more but less than 2% of $Y_2O_3$, 0 to 5% of $Yb_2O_3$, 0 to 18% of $Ta_2O_5$, 0 to 20% of $Bi_2O_3$, 0 to 10% of $GeO_2$, 0% or more but less than 2% of $Sb_2O_3$, and 0% or more but less than 2% of $SnO_2$, and having a refractive index ($n_d$) of over 1.8, Abbe's number ($v_d$) of 28 to 40 and a density of 4.2 g/cm³ or more.

12 Claims, No Drawings

1

OPTICAL GLASS, GLASS GOB FOR PRESS-MOLDING, OPTICAL PART, PROCESS FOR PRODUCING GLASS SHAPED MATERIAL AND PROCESS FOR PRODUCING OPTICAL PART

TECHNICAL FIELD

The present invention relates to a high-refractivity optical glass, a press-molding glass gob formed of the glass, an optical part, a process for producing a glass shaped material and a process for producing an optical part.

TECHNICAL BACKGROUND

In recent years, as digital cameras have been in widespread use, there are growing demands for small-size lenses. As an optical glass material for producing such small-size lenses, a high-refractivity glass having a refractive index ($n_d$) of over 1.8 is suitable.

However, in conventional glasses, disadvantageously, the coloring tendency thereof is intensified, or the stability of glass production is decreased, with an increase in the refractive index. In particular, when the coloring tendency is intensified, a digital camera or the like has a problem that since CCD and the like are used in an image sensing device, the sensitivity to blue on a short wavelength side among three primary colors is decreased when an imaging system is seen as a whole.

Further, as a high-refractivity glass having a refractive index ($n_d$) of over 1.8, there are known glasses that are used as ophthalmic lens materials such as glasses disclosed in JP-A-3-5340, JP-A-6-56462 and JP-A-6-87628, although they are not used for a camera lens. While these glasses have low densities and are excellent as ophthalmic lens materials, they are not suitable from the viewpoint of an improvement in production stability due to a high priority put on a decrease in density.

DISCLOSURE OF THE INVENTION

Problems to be Solved by the Invention

The present invention has been made for overcoming the above problems, and it is an object of the present invention to provide an optical glass having high light transmittance, a high refractive index and excellent production stability, a press-molding glass gob formed of the above glass, an optical part formed of the above glass, a process for producing a glass shaped material formed of the above glass and a process for producing the above optical part.

Means to Solve the Problems

For achieving the above object, the present inventor has made diligent studies, and as a result, it has been found that the above object can be achieved by an optical glass having a specific composition. On the basis of this finding, the present invention has been completed.

That is, according to the present invention, there are provided (1) an optical glass comprising at least one of CaO and SrO together with $SiO_2$, $B_2O_3$, $La_2O_3$, $Nb_2O_5$, $TiO_2$ and BaO, having a composition that substantially contains, by weight %, 1 to 18% of $SiO_2$,
3 to 24% of $B_2O_3$, provided that the ratio of content of $B_2O_3$ to the content of $SiO_2$ ($B_2O_3/SiO_2$) is over 1,
10 to 50% of $La_2O_3$,
3 to 30% of $Nb_2O_5$,
1 to 30% of $TiO_2$,
over 6% but not more than 25% of BaO,
less than 7% of CaO,
6% or less of SrO,
0 to 13% of MgO, provided that the total content of BaO, CaO, SrO and MgO is 40% or less,
0 to 15% of ZnO,
0 to 15% of $ZrO_2$,
0 to 10% of $Al_2O_3$,
0 to 20% of $Gd_2O_3$,
0% or more but less than 2% of $Y_2O_3$,
0 to 5% of $Yb_2O_3$,
0 to 18% of $Ta_2O_5$,
0 to 20% of $Bi_2O_3$,
0 to 10% of $GeO_2$,
0% or more but less than 2% of $Sb_2O_3$, and
0% or more but less than 2% of $SnO_2$, and having a refractive index ($n_d$) of over 1.8, an Abbe's number ($v_d$) of 28 to 40 and a density of 4.2 g/cm$^3$ or more, (2) an optical glass as recited in the above (1), wherein the ratio of the content of CaO to the content of BaO (CaO/BaO) is 2 or less and/or the ratio of the content of SrO to the content of BaO (SrO/BaO) is 2 or less, (3) an optical glass as recited in the above (2), wherein the ratio of the content of CaO to the content of BaO (CaO/BaO) is from 0.1 to 2 and/or the ratio of the content of SrO to the content of BaO (SrO/BaO) is from 0.1 to 2, (4) an optical glass as recited in the above (1), which has a refractive index ($n_d$) of over 1.86, (5) an optical glass as recited in the above (1), which has a liquidus temperature and has a kinematic viscosity, measured at the liquidus temperature, of $0.70 \times 10^{-4}$ to $4.0 \times 10^{-4}$ m$^2$/s, (6) a press-molding glass gob formed of the optical glass recited in the above (1), (7) an optical part formed of the optical glass recited in the above (1), (8) a process for producing a glass shaped material, which comprises causing a refined and homogenized molten glass stored in a vessel to flow out of a pipe outlet and preparing a glass shaped material formed of the optical glass recited in the above (1), and (9) a process for producing an optical part, which comprises the step of softening the press-molding glass gob recited in the above (6) under heat and press-molding the press-molding glass gob.

EFFECT OF THE INVENTION

According to the present invention, there can be provided an optical glass having high light transmittance, a high refractive index and excellent production stability, a press-molding glass gob formed of the above optical glass, an optical part formed of the above optical glass, a process for producing a glass shaped material formed of the above optical glass and a process for producing the above optical part.

PREFERRED EMBODIMENTS OF THE INVENTION

Optical Glass

First, the optical glass of the present invention will be explained.

The optical glass of the present invention is an optical glass comprising at least one of CaO and SrO together with $SiO_2$, $B_2O_3$, $La_2O_3$, $Nb_2O_5$, $TiO_2$ and BaO, having a composition that substantially contains, by weight %, 1 to 18% of $SiO_2$,
3 to 24% of $B_2O_3$, provided that the ratio of content of $B_2O_3$ to the content of $SiO_2$ ($B_2O_3/SiO_2$) is over 1,
10 to 50% of $La_2O_3$,
1 to 30% of $Nb_2O_5$,
1 to 30% of $TiO_2$,
over 6% but not more than 25% of BaO,
less than 7% of CaO,
6% or less of SrO,
0 to 13% of MgO, provided that the total content of BaO, CaO, SrO and MgO is 40% or less,
0 to 15% of ZnO,
0 to 15% of $ZrO_2$,
0 to 10% of $Al_2O_3$,
0 to 20% of $Gd_2O_3$,
0% or more but less than 2% of $Y_2O_3$,
0 to 5% of $Yb_2O_3$,
0 to 18% of $Ta_2O_5$,
0 to 20% of $Bi_2O_3$,
0 to 10% of $GeO_2$,
0% or more but less than 2% of $Sb_2O_3$, and
0% or more but less than 2% of $SnO_2$, and having a refractive index ($n_d$) of over 1.8, Abbe's number ($v_d$) of 28 to 40 and a density of 4.2 g/cm³ or more.

First, the composition and properties of the optical glass of the present invention will be explained below. Contents and total contents of glass components and additive (refining agent) expressed by % below stand for contents and total contents by weight %.

$SiO_2$ is a component for a glass-network-forming component for maintaining devitrification resistance. The content thereof is in the range of 1 to 18%, preferably 1 to 15%, more preferably 3 to 12%, still more preferably 4 to 10%. When the content of $SiO_2$ is too small, the viscosity of a molten glass is low, so that it is difficult to form a high-quality glass. When it is too large, the glass is poor in meltability, so that no glass can be stably produced and that it is difficult to obtain the intended optical constants.

$B_2O_3$ is a component that is effective for forming a glass network and that is effective for decreasing the glass meltability and decreasing the temperature for fluid viscosity. The content thereof is required to be at least 3%. However, when the content exceeds 24%, the refractive index is decreased, and there can be obtained no glass having optical constants in the intended ranges. Therefore, the content of $B_2O_3$ is 3 to 24%, preferably 5 to 20%, more preferably 6 to 18%, still more preferably 6 to 16%.

Further, when the ratio of the content of $B_2O_3$ to the content of $SiO_2$, i.e., $B_2O_3/SiO_2$, is 1 or less, the glass is degraded in meltability and devitrification resistance, so that the ratio of $B_2O_3/SiO_2$ is adjusted to over 1. When a glass having low meltability or low devitrification resistance is melted and molded, it is required to increase the melting temperature thereof to excess in order to prevent a remaining non-melted raw glass material or devitrification when the glass is caused to flow out or molded. When a glass is melted at an excessively high temperature, the glass is liable to be colored. However, the coloring of the glass can be decreased by adjusting the ratio of $B_2O_3/SiO_2$ to over 1. The above ratio of $B_2O_3/SiO_2$ is preferably at least 1.2, more preferably at least 1.5.

$La_2O_3$ is an essential component for obtaining a high-refractivity low-dispersion glass. However, when the content of $La_2O_3$ is less than 10%, the refractive index is decreased, and when it is larger than 50%, the devitrification resistance is decreased, so that there cannot be obtained any glass that can be stably produced. Therefore, the content of $La_2O_3$ is 10 to 50%, preferably 18 to 47%, more preferably 25 to 47%, still more preferably 27 to 45%.

$Nb_2O_5$ is a component that attains a high refractive index, and it effectively works to improve the glass in devitrification resistance. However, when the content thereof exceeds 30%, light absorption on the short wavelength side is intensified, and the glass intensively tends to be colored. Therefore, the content of $Nb_2O_5$ is 1 to 30%, preferably 1 to 20%, more preferably 1 to 15%.

$TiO_2$ is an essential component that is used for improving the glass in chemical durability and devitrification resistance while adjusting optical properties such as a refractive index, an Abbe's number, and the like. However, when the content thereof is less than 1%, the devitrification resistance is decreased, and when it exceeds 30%, not only the transmittance to short wavelength light is decreased, but also the glass is degraded in meltability. Therefore, the content of $TiO_2$ is 1 to 30%, preferably 1 to 26%, more preferably 8 to 20%.

For obtaining a glass having excellent transmittance, preferably, the content of $Nb_2O_5$ is smaller than the content of $TiO_2$. More preferably, the weight ratio of $Nb_2O_5/TiO_2$ is smaller than 0.8, and still more preferably, the weight ratio of $Nb_2O_5/TiO_2$ is smaller than 0.5.

BaO is a component for providing the glass with a high refractive index, and it has an effect on the improvement of transmittance of the glass on the short wavelength end of the visible light region, so that over 6% of BaO is introduced. When the content of BaO exceeds 25%, the glass is degraded in devitrification resistance. Therefore, the content of BaO is over 6% but not more than 25%, preferably 7 to 20%, more preferably at least 7% but less than 13%, still more preferably at least 8% but less than 13%.

One of typical features of the present invention is that a predetermined content of at least one of CaO and SrO is incorporated as a glass component.

The optical glass of the present invention contains at least one of CaO and SrO as a glass component, and includes a glass containing CaO out of CaO and SrO, a glass containing SrO out of CaO and SrO and a glass containing both CaO and SrO. Of these glasses, for increasing the kinematic viscosity to be described later, a glass containing CaO out of CaO and SrO and a glass containing both CaO and SrO are preferred, and a glass containing CaO out of CaO and SrO is more preferred. When the function of CaO is partially supplemented by SrO, preferably, the content of CaO in the glass containing both CaO and SrO is greater than the content of SrO.

The content of CaO is less than 7%, preferably at least 0.1% but less than 7%, more preferably 0.1 to 6%, still more preferably 1 to 6%, further more preferably 2 to 6%, yet more preferably 3 to 6%, particularly preferably 3 to 5%.

Further, the content of SrO is 6% or less, preferably 5% or less, more preferably 1% or less, still more preferably 0.1 to 0.8%.

When the content of CaO and SrO are in the above ranges, the light absorption of the glass on the short wavelength side of the visible light region and the devitrification resistance of the glass are maintained in a good state. Further, a glass density of at least 4.2 g/cm$^3$ can be maintained, and at the same, this value can be adjusted such that the value is not far larger than 4.2 g/cm$^3$. Therefore, the kinematic viscosity of the glass, which is determined on the basis of the ratio of the viscosity at the liquidus temperature of the glass to the density of the glass can be increased, and the occurrence of striae caused by a turbulent flow during the production of a glass shaped material can be effectively prevented.

The relationship between the kinematic viscosity and the occurrence of striae caused by turbulence during the production of a glass shaped material will be explained below.

As a method for obtaining a glass shaped material from a molten glass, there is a method in which a refined and homogenized glass stored in a vessel is caused to flow down through a pipe and a molten glass flowing out of a pipe outlet is formed into a shaped material during its cooling step.

It is required to cause a glass to flow out at a temperature higher than a temperature at which the glass is devitrified. For a glass having a high devitrification temperature, therefore, it is required to employ a high temperature as a temperature at which the glass is caused to flow out. In this case, however, the glass viscosity at a flowing-out time is decreased. Generally, a glass having a large content of a glass-network-forming component has high stability, and the devitrification of the glass can be prevented even when the glass is caused to flow out at a relatively low temperature. Such a glass can be caused to flow out at such a viscosity that a high quality glass can be easily formed. In a high-refractivity glass such as the optical glass of the present invention, however, the content of a glass-network-forming component is relatively small as compared with a glass that does not have such a high refractive index, since the content of a high-refractivity-imparting component is increased. In the high-refractivity glass, therefore, it is required to employ a relatively high temperature as a temperature at which the glass is caused to flow out, for preventing devitrification, and the glass comes to have a low viscosity when caused to flow out.

When such a low-viscosity glass is caused to flow down from a vessel through a pipe according to the above-described method, the glass that is flowing out is more liable to have a turbulent flow therein with an increase in the glass density, and the turbulent flow causes striae to occur in a glass shaped material. The striae by a turbulent flow depend upon not only the density of the glass but also the viscosity of the glass at the liquidus temperature thereof (referred to as "liquidus viscosity"), and the occurrence of striae can be decreased by increasing the kinematic viscosity (liquidus viscosity/density of glass) defined by a ratio of the liquidus viscosity of the glass to the density of the glass. The optical glass of the present invention preferably has a density of less than 4.70 g/cm$^3$ for preventing an increase in the weight of an optical part and a consequent increase in the electric power for actuating a lens, or the like.

Since the optical glass of the present invention contains a predetermined amount of at least one of CaO and SrO, the density and liquidus viscosity of the glass obtained are limited to proper ranges, and the occurrence of striae by a turbulent flow can be effectively prevented.

Further, the contents of BaO, CaO and SrO are limited to the above ranges, so that the glass transition temperature (Tg) can be decreased, that the glass can be improved in moldability when the glass is press-molded, particularly when the glass is press-molded by re-heating the glass, and that the temperature for annealing the glass can be decreased. Therefore, a burden on a molding apparatus or an annealing furnace can be decreased. The optical glass of the present invention is hence preferred from the viewpoint of energy saving.

When CaO is introduced as a glass component, for attaining improvements in stability of the glass in production, press-moldability of the glass and light transmittance on the short wavelength side in the visible light region while maintaining high-refractivity low-dispersion properties, the ratio of the content of CaO to the content of BaO (CaO/BaO) is adjusted preferably to 2 or less, more preferably to 0.1 to 2, still more preferably to 0.1 to 1, further more preferably to 0.1 to 0.9, yet more preferably to 0.1 to 0.88, particularly preferably to 0.15 to 0.88.

When SrO is introduced, for mass-producing a glass having a constant light transmittance on the short wavelength side of the visible light region, the ratio of the content of SrO to the content of BaO (SrO/BaO) is adjusted preferably to 2 or less, more preferably to 1.8 or less, still more preferably to 1.7 or less, further more preferably to 0.1 to 1.65, yet more preferably to 0.25 to 1.62.

MgO is an optional component that can be introduced for adjusting optical constants, and the content thereof is 0 to 13%, preferably 0 to 10%, more preferably 0 to 5%.

In view of the devitrification resistance of the glass, the total content of BaO, CaO, SrO and MgO is limited to 40% or less, preferably to 30% or less, more preferably to 20% or less. As a glass raw material for BaO, CaO, SrO or MgO, a carbonate or nitrate can be used, and such a raw material can promote deforming or refining effect.

ZnO is a component that not only imparts the glass with high-refractivity low-dispersion properties and improves the glass in devitrification resistance but also has an effect on decreasing the viscous-flowing temperature. However, when the content of ZnO is greater than 15%, the devitrification is intensified, and there can be obtained no glass that can be stably produced. Therefore, the content of ZnO is 0 to 15%, preferably 0 to 13%, more preferably 0.5 to 5%, still more preferably 1 to 5%.

$ZrO_2$ is a component that imparts the glass with high refractivity, and it effectively works to improve the devitrification resistance when introduced in a small amount, so that it is introduced such that its content is in the range of 0 to 15%. However, when the content of $ZrO_2$ exceeds 15%, the devitrification resistance is rather decreased, and the meltability of the glass is also degraded. Therefore, the content of $ZrO_2$ is 0 to 15%, preferably 0 to 10%, more preferably 1 to 10%, still more preferably 3 to 8%.

$Al_2O_3$ sometimes works to improve the devitrification resistance when introduced in a small amount. At the same time, however, it decreases the refractive index. Therefore, the content of $Al_2O_3$ is 0 to 10%, preferably 0 to 5%, more preferably 0 to 3%.

$Gd_2O_3$ can be introduced up to 20% as a partial substitute for $La_2O_3$. When the content of $Gd_2O_3$ exceeds 20%, the glass is degraded in devitrification resistance, and there can be obtained no glass that can be stably produced. Therefore, the content of $Gd_2O_3$ is 0 to 20%, preferably 0 to 10%, more preferably 0 to 5%, still more preferably 0 to 3%. Desirably, $Gd_2O_3$ is not added.

$Y_2O_3$ and $Yb_2O_3$ can be also introduced in an amount of 0% or more but less than 2% and in an amount of 0 to 5%, respectively, as a partial substitute for $La_2O_3$. However, when the contents of them exceed these amounts, the glass is degraded in devitrification resistance, and there can be obtained no glass that can be stably produced. $Y_2O_3$ and $Yb_2O_3$ are components that exhibit an effect similar to the effect of $La_2O_3$. However, these $Y_2O_3$ and $Yb_2O_3$ as raw materials are expensive as compared with $La_2O_3$ and are hence economically disadvantageous, so that it is desirable to decrease the content of $Y_2O_3$ and $Yb_2O_3$. The contents of $Y_2O_3$ and $Yb_2O_3$ are preferably 0 to 1% and 0 to 4%, respectively, and it is more preferred not to introduce them. In particular, $Yb_2O_3$ causes disadvantages that the density of the glass is increased to decrease the kinematic viscosity or increase the weight of an optical part and that the electric power consumed for actuating a lens, etc., is increased.

$Ta_2O_5$ is a component that attains high refractivity and low dispersion and is useful for forming a low-dispersion glass. When the content of $Ta_2O_5$ exceeds 18%, however, the glass is degraded in meltability. Therefore, the content of $Ta_2O_5$ is 0 to 18%, preferably at least 0% but less than 5%. In view of an economic performance, $Ta_2O_5$ is expensive, and it is hence more preferred not to introduce $Ta_2O_5$.

$Bi_2O_3$ effectively works to decrease the glass transition temperature (Tg) when introduced in a small amount. However, when the content thereof exceeds 20%, the devitrification resistance is decreased, and the coloring tendency of the glass is intensified. Therefore, the content of $Bi_2O_3$ is 0 to 20%, preferably 0 to 10%, more preferably 0 to 5%. Still more preferably, $Bi_2O_3$ is not introduced.

$GeO_2$ has an effect similar to the effect of $SiO_2$ and can be introduced up to 10%. However, when the content of $GeO_2$ exceeds 10%, the devitrification resistance is decreased. Therefore, the content of $GeO_2$ is 0 to 10%, preferably 0 to 3%. $GeO_2$ is a very expensive raw material, so that it is more preferred not to introduce $GeO_2$.

When a high-refractivity glass such as the glass of the present invention has low devitrification resistance, it is required to increase the temperature (decrease the viscosity) of a molten glass when a glass shaped material is produced from the molten glass, for preventing the devitrification thereof, and the risk of striae being caused is increased. Therefore, even a slight decrease in devitrification resistance is not preferred.

$Li_2O$, $Na_2O$ and $K_2O$ are components effective for decreasing the glass transition temperature (Tg), and in particular, $Li_2O$ is highly effective for decreasing the glass transition temperature. Since, however, these alkali metal oxides decrease the devitrification resistance of the glass and also decrease the refractive index, it is desirable not to introduce these alkali metal oxides, for highly productively producing a high-quality glass. On the other hand, when it is intended to decrease the glass transition temperature (Tg) or improve the glass in meltability at the cost of the devitrification resistance, at least one of $Li_2O$, $Na_2O$ and $K_2O$ can be introduced in a total amount of 0% or more but less than 1.5%, preferably 0 to 1%, more preferably 0 to 0.5%.

When a glass shaped material is formed by causing a molten glass to flow out of a pipe, a decrease in the devitrification resistance of the glass is a big problem to be solved from a viewpoint of decreasing and preventing the occurrence of striae. It is therefore preferred not to introduce alkali metal components including the alkali metal oxides.

$WO_3$ works to improve the glass in devitrification resistance when added in a small amount. However, if even a slight amount of $WO_3$ is introduced into the above glass, the light absorption of the glass in the short wavelength region of the visible light region is intensified, and the coloring tendency is markedly intensified, so that it is desirable not to introduce $WO_3$. When the preference is put on an improvement in devitrification resistance at the cost of the coloring of the glass, 0% or more but less than 0.5% of $WO_3$ can be introduced.

The optical glass of the present invention is substantially obtained by optionally adding a refining agent to the above glass components.

In addition to the above components, $Sb_2O_3$ and $SnO_2$ which are generally used as a refining agent can be added in an amount of 0% or more but less than 2%, respectively. The amount of each of $Sb_2O_3$ and $SnO_2$ is 0% or more but less than 2%, preferably 0 to 1%, more preferably 0 to 0.5%, and it is still more preferred not to add these.

For not only improving the production stability more but also suppressing the light absorption of the glass on the short wavelength side of the visible light region while realizing the high-refractivity low-dispersion properties as described above, it is preferred to limit the total content of $SiO_2$, $B_2O_3$, $La_2O_3$, $Nb_2O_5$, $TiO_2$, $BaO$, $CaO$, $SrO$, $MgO$, $ZnO$, $ZrO_2$, $Al_2O_3$, $Sb_2O_3$ and $SnO_2$ to 100%.

In the optical glass of the present invention, high refractivity can be realized without introducing PbO that is known as a high-refractivity-imparting component. PbO is a component of which use is undesirable from the viewpoint of environmental protection, so that it is preferred not to introduce PbO. Similarly, Cd, Cr and As are components of which use is undesirable from the viewpoint of environmental protection, so that it is preferred not to introduce Cd, Cr and As.

Further, the optical glass of the present invention can attain a higher refractive index without containing $Lu_2O_3$ $Lu_2O_3$ is expensive, so that it is preferred not to introduce $Lu_2O_3$ in view of economic performances.

Further, F has an adverse effect on the homogeneity of the glass, so that it is preferred as well not to introduce F.

The optical glass of the present invention will be explained below with regard to its optical properties.

The optical glass of the present invention has a refractive index ($n_d$) of over 1.8 and an Abbe's number ($v_d$) of 28 to 40. When the composition of a glass is adjusted for increasing the refractive index, the devitrification resistance is liable to be decreased. However, the optical glass of the present invention can attain excellent devitrification resistance, so that the refractive index can be further increased. Therefore, the refractive index ($n_d$) of the glass of the present invention is preferably at least 1.81, more preferably over 1.86, still more preferably at least 1.87. For preventing the impairment of the production stability of the glass, the above refractive index ($n_d$) is desirably limited to 2.1 or less, more desirably to 1.93 or less.

Further, the Abbe's number ($v_d$) of the optical glass of the present invention is preferably 28 to 34 for the production stability of the glass.

When the glass density is decreased to excess, the production stability is greatly decreased as described above, so that the optical glass of the present invention has a density of at least 4.2 g/cm$^3$. Further, when the glass density is increased to excess, the production stability is also decreased, so that the optical glass of the present invention preferably has a density of at least 4.2 g/cm$^2$ but less than 4.70 g/cm$^2$. The glass density as used in the present specification refers to a density of a glass at room temperature.

As described already, a glass has a liquidus temperature, and a value obtained by dividing a viscosity at a liquidus temperature by a density of a glass (liquidus viscosity/glass density) is referred to as "kinematic viscosity". As explained already, when the kinematic viscosity of the glass is too low, striae are liable to occur due to the turbulent flow of the glass.

When the kinematic viscosity is too high, it is difficult to cause the glass to flow out.

From the above viewpoint, the kinematic viscosity of the optical glass of the present invention is preferably $0.70\times10^{-4}$ to $4.0\times10^{-4}$ m$^2$/s, more preferably $0.80\times10^{-4}$ to $4.0\times10^{-4}$ m$^2$/s, still more preferably $1.00\times10^{-4}$ to $4.0\times10^{-4}$ m$^2$/s, yet more preferably $1.05\times10^{-4}$ m$^2$/s to $4.0\times10^{-4}$ m$^2$/s, further more preferably $1.05\times10^{-4}$ to $2.5\times10^{-4}$ m$^2$/s, particularly preferably $1.05\times10^{-4}$ to $2.0\times10^{-4}$ m$^2$/s.

According to the present invention, the coloring degree $\lambda_{70}$ of the glass can be adjusted to 430 nm or less, preferably, to 420 nm or less. Since the optical glass of the present invention can have an external transmittance of 70% or more in a wavelength region of $\lambda_{70}$ to 700 nm, it is suitable as a glass material for various optical parts.

The above coloring degree $\lambda_{70}$ means a wavelength measured in the following manner.

A 10 mm thick glass sample having two optically polished flat surfaces which are in parallel with each other is provided, a light having a wavelength of 280 to 700 nm is caused to enter the glass sample at right angles through one of the above two flat surfaces and come out through the other flat surface, and the glass sample is measured for an external transmittance of the light (including a reflection loss on the glass sample surface). The coloring degree $\lambda_{70}$ refers to a wavelength at which the above external transmittance comes to be 70%.

A 10 mm thick sample is not necessarily required for measurement of $\lambda_{70}$, and a sample having a different thickness can be used and the measurement value can be converted. $\lambda_{80}$ and $\lambda_5$ refer to a wavelength at which the external transmittance comes to be 80% and the external transmittance comes to be 5%, respectively, when the above glass sample is measured in the above wavelength region.

When a glass is used as a material for an optical part constituting an image-sensing optical system, the coloring caused by light absorption of the glass on the short wavelength end side of the visible light region has an acute effect on the merits of the optical system. The above coloring is a combination of a coloring caused by a glass composition per se with a coloring caused by platinum ion that is from a vessel made of platinum or a platinum alloy and comes to be dissolved in the glass. Platinum ion comes to be dissolved to a greater extent as the melting temperature is increased, so that it is required to decrease the melting temperature and the refining temperature significantly even for slightly decreasing the coloring caused by platinum ion. There is hence caused a problem that the removal of foams or bubbles comes to be poor. Therefore, the decreasing of the above coloring even slightly is significant in view of the glass composition.

The optical glass of the present invention can be preferably controlled so as to have a glass transition temperature (Tg) of 680° C. or lower, so that press-moldability can be improved and that a longer lifetime of an annealing furnace can be attained. However, when the glass transition temperature (Tg) is decreased to excess, there may be caused a disadvantage such as a decrease in refractive index or impairment of production stability, so that a glass transition temperature (Tg) of 620° C. or higher is desirable.

[Press-Molding Glass Gob]

The press-molding glass gob (glass gob for press-molding) of the present invention is characteristically formed of the above optical glass of the present invention. The press-molding glass gob is a glass mass having a weight approximately equivalent to the weight of a glass press-molded product, and it is softened under heat to be press-molded. The surface of the glass gob may be roughened or smoothened as required for use. When a mold release agent having the form of a powder is applied to the surface of the glass gob for press-molding, the glass gob preferably has a roughened surface so that the mold release agent can be uniformly applied. When a surface (to be referred to as "transfer surface") obtained by accurately transferring the form of the molding surface of a press mold is used as a is used as a surface of an end glass product, for example, when precision press-molding is carried out for forming a transfer surface to be used as a surface for incident light and outgoing light, it is preferred to use a glass gob having a smoothened surface. The press-molding glass gob of the present invention can be produced, for example, by a process for producing a glass shaped material to be described later.

[Process for Producing Glass Shaped Material]

The process for producing a glass shaped material, provided by the present invention, comprises causing a refined and homogenized molten glass stored in a vessel to flow out of a pipe outlet and preparing a glass shaped material formed of the above optical glass.

The above vessel and the above pipe are preferably formed from platinum or a platinum alloy. The vessel and the pipe are preferably temperature-adjusted under heat so that the molten glass has a temperature in a proper temperature range. The upper end of the pipe is connected to a bottom of the vessel, and a refined and homogenized molten glass in the vessel continuously flows into the pipe through the upper end of the pipe and flows down inside the pipe. The flow rate of the glass flowing out of the pipe outlet is controlled depending upon a height difference (called "head difference") between the liquid level of the molten glass in the vessel and the pipe outlet and the viscosity resistance of the glass and so on. When a molten glass flow is caused to flow out and cast into a mold at a high flow rate, a turbulent flow is caused in the cast glass, and the glass comes to be cooled to solidness in this state, so that striae occur. For decreasing or preventing such striae, the flow rate of the glass that is caused to flow out can be decreased.

According to the process for producing a glass shaped material, provided by the present invention, the above glass that is caused to flow out is the optical glass of the present invention, so that the viscosity and density of a glass can be adjusted into a state effective for decreasing and preventing the occurrence of striae, and that there can be hence produced a glass shaped material having optically high homogeneity. For decreasing the striae, desirably, the above head difference is 2 m or less. The glass that is cast into the mold is shaped into a form defined by the mold and is gradually cooled.

The thus-obtained glass shaped material includes a material having the form of a plate, a block, a rod, a column, or the like, a glass gob, and the like.

For producing the press-molding glass gob, the above glass shaped material whose strain is reduced by annealing and which has the form, for example, of a plate, a block, a rod or a column is cut or split to obtain a glass piece having a form close to the form of a glass gob, and the glass piece is mechanically processed to finish it to the form of a desired glass gob. When the glass gob is to be surface-roughened, the glass piece can be barrel-polished, and when it is to be surface-smoothened, the glass piece can be ground and polished. Alternatively, a glass is caused to drop from a pipe outlet, or a glass having a predetermined weight is separated from a molten glass flow, and the glass is shaped into a glass gob during the cooling of the separated glass to solidness. The thus-obtained glass gob may be subjected to a mechanical process such as grinding, polishing, barrel-polishing, or the like.

In any case, a press-molding glass gob having optically high homogeneity can be prepared from the molten glass.

[Optical Part]

The optical part of the present invention is characteristically formed of the above optical glass of the present invention, and examples thereof include various optical lenses, a substrate for an optical apparatus, a diffraction grating, a prism, and the like. In addition to the process for producing an optical part, which is provided by the present invention and will be described below, the method for producing the optical part of the present invention includes, for example, a method in which a molten glass is received with a press mold and press-molded while the glass is in a softened state and a method in which a glass molded product obtained by press-molding is subjected to grinding and polishing to obtain the optical part.

Since the thus-obtained optical part is formed of the glass having high-refractivity low-dispersion properties, the optical part can be downsized when it is a lens, a prism, or the like. Further, since the light absorption of the glass on the short wavelength end side of the visible light region can be suppressed, there can be attained high light transmittance, so that the above optical part is suitable for constituting an image-sensing optical system (e.g., an image-sensing optical system of a digital camera) that exhibits excellent color reproducibility.

[Process for Producing Optical Part]

The process for producing an optical part, provided by the present invention, comprises the step of softening the press-molding glass gob of the present invention under heat and press-molding the glass gob.

The process for producing an optical part by press-molding the glass gob includes, for example, a process which comprises press-molding a glass gob having a form similar to the form of an end optical part to form a press-molded product and having a size larger than the size of the end optical part to form a press-molded product and then grinding and polishing the press-molded product. In this process, the glass gob is inserted between a pair of upper and lower mold members, then heated at a temperature, for example, between a glass transition temperature +100° C. and a glass transition temperature +500° C., preferably at a temperature between a glass transition temperature +100° C. and a glass transition temperature +300° C., for 5 to 30 minutes and molded under pressure. It is preferred to apply a mold release agent such as a boron nitride powder or the like to the glass gob surface in advance, and it is preferred to provide the press-molding surface of the mold with a mold release film such as a carbon film, or the like in advance. Then, the above press-molded product is ground and polished, whereby a desired optical part can be obtained. From the viewpoint of preventing the breaking of the glass during the above processing, preferably, the press-molded product is annealed to decrease its strain.

When an optical element such as a lens or the like is produced as an optical part, the refractive index ($n_d$) and the Abbe's number (vd) of the optical element slightly change due to a thermal history in the process of its production. When it is intended to produce an optical element having precisely determined optical constants, the glass composition and the thermal history in the process of its production can be adjusted by taking account of the above change in refractive index ($n_d$) and Abbe's number (vd).

In addition to the above method, a glass having a predetermined weight is separated from a molten glass flow that is caused to flow out of a pipe, then, the separated glass is immediately press-molded and cooled to obtain a press-molded product, and the press-molded product is ground and polished, whereby the optical part can be obtained as well.

EXAMPLES

The present invention will be explained below with reference to Examples, while the present invention shall not be limited by these Examples.

Example 1

Tables 1-1 to 1-3 show compositions and properties of glass samples 1-14 prepared in Example 1. Glass samples shown in Tables 1-1 to 1-3 were obtained in the following manner. A raw material batch prepared so as to give 100 g of an optical glass shown in Tables 1-1 to 1-3 was placed in a crucible made of platinum, melted in a furnace set at 1,100 to 1,300° C., stirred and refined, and then the refined glass was cast into a frame made of iron, maintained at a temperature around its glass transition temperature (Tg) for 2 hours and annealed.

Each glass sample was measured for a refractive index ($n_d$), an Abbe's number (vd), a glass transition temperature (Tg), a sag temperature (Ts), a kinematic viscosity, $\lambda_{80}$, $\lambda_{70}$ and $\lambda_5$ as follows. Tables 1-1 to 1-3 show the results.

(1) Refractive Index ($n_d$) and Abbe's Number (vd)

An optical glass obtained by cooling at a temperature-decrease rate of 30° C. per hour was measured.

(2) Glass Transition Temperature (Tg)

An optical glass was measured at a temperature elevation rate of 4° C./minute with a thermomechanical analysis apparatus (Thermo Plus TMA 8310 supplied by Rigaku Corporation).

(3) Kinematic Viscosity

A plurality of crucibles made of platinum were provided, 50 cm$^3$ of a glass was placed in each crucible, each crucible was covered and the crucibles were placed in furnaces of which the temperatures were set at intervals of furnaces of which the temperatures were set at intervals of 10° C. The crucibles were maintained in the furnaces having different temperatures for 2 hours and cooled, and insides of the glasses were observed through a microscope of 100 magnifications. A liquidus temperature was determined according to whether or not a crystal was present.

The glass was measured for a viscosity at the above liquidus temperature, the found viscosity was taken as a liquidus viscosity, and the liquidus viscosity of the glass sample was divided by the glass density, to obtain a kinetic viscosity.

(4) $\lambda_{80}$, $\lambda_{70}$ and $\lambda_5$

A 10 mm thick sample having two flat surfaces which were in parallel with each other and optically polished was measured for a spectral transmittance. A wavelength (nm) at which the transmittance was 80% was determined to be $\lambda_{80}$, a wavelength (nm) at which the transmittance was 70% was determined to be $\lambda_{70}$ and a wavelength (nm) at which the transmittance was 5% was determined to be $\lambda_5$.

In the above manner, there were obtained optical glasses having predetermined optical constants, $\lambda_{70}$ of 430 nm or less, $\lambda_{80}$ of 510 nm or less and $\lambda_5$ of 380 nm or less and having excellent light transmittance and excellent devitrification resistance. Further, all of the thus-obtained glasses had a kinematic viscosity in the range of 0.70×10$^{-4}$ to 4.0×10$^{-4}$ m$^2$/s.

Example 2

Molten glasses that would give optical glasses of Example 1 were prepared, and glass plates formed of the optical glasses were obtained in the following manner. A refined and homogenized molten glass was caused to continuously flow out of a pipe made of platinum at a constant flow rate and cast into a casting die that was horizontally arranged below the pipe and that had one open side portion, and while the glass was shaped into a glass plate having a constant thickness, the thus-formed glass plate was withdrawn through the open side portion of the die. The withdrawn glass plate was annealed in an annealing furnace to decrease a strain, to give a glass plate which was free of striae and foreign matter and which was less colored.

Then, the above glass plates were cut each in the length and width directions to give a plurality of glass pieces having the form of a rectangular parallelepiped having the same dimension. Further, a plurality of the glass pieces were barrel-polished so that they had a weight equivalent to the weight of an end press-molded product, and they were used as press-molding glass gobs.

In addition to the above method, there may be employed a method in which the above molten glass is caused to flow out of a nozzle made of platinum, a number of receiving molds are transferred one after another below the nozzle to receive molten glass masses having a predetermined weight each, each molten glass mass is shaped into the form of a sphere or a body of revolution, annealed and barrel-polished so as to have a weight equivalent to the weight of an end press-molded product. Thus, glass masses are converted to press-molding glass gobs.

Example 3

Lens blanks having a form including a margin to be removed by grinding and polishing and being similar to the form of an end lens were formed from the glass gobs obtained in Example 2 in the following manner. A powder mold release agent such as a boron nitride powder was applied to the entire surface of a glass gob, the glass gob was softened by heating with a heater and then introduced into a press mold having upper and lower mold members, and the glass gob was pressed with a press mold.

Then, each lens blank was annealed to decrease a strain and finely adjust the refractive index and Abbe's number of each glass to predetermined values. The lens blanks cooled were ground and polished to complete lenses. A series of the above steps were carried out in atmosphere. All of the thus-obtained lenses had excellent light transmittance. Each of the lenses may be provided with an optical multi-layered film such as an anti-reflection film as required.

Such a lens can be used to constitute an excellent optical image-sensing system.

In addition, other optical elements such as a prism can be produced by selecting the form of the press mold and the volume of the glass gob as required.

TABLE 1-1

| | Wt. % | | | | | |
|---|---|---|---|---|---|---|
| | 1 | 2 | 3 | 4 | 5 | 6 |
| $SiO_2$ | 6.81 | 6.97 | 6.71 | 6.78 | 6.95 | 6.92 |
| $B_2O_3$ | 13.55 | 13.83 | 13.30 | 13.47 | 13.76 | 13.66 |
| $La_2O_3$ | 37.20 | 38.05 | 36.61 | 37.02 | 38.11 | 38.18 |
| $Nb_2O_5$ | 5.50 | 5.63 | 5.42 | 5.48 | 5.61 | 5.59 |
| $TiO_2$ | 12.91 | 13.21 | 12.71 | 12.85 | 13.16 | 13.12 |
| BaO | 12.09 | 8.79 | 11.90 | 8.55 | 9.65 | 10.51 |
| CaO | 1.92 | 3.27 | 0.00 | 0.00 | 3.26 | 3.25 |
| SrO | 0.00 | 0.00 | 3.48 | 5.87 | 0.00 | 0.00 |
| MgO | 0.00 | 0.00 | 0.00 | 0.00 | 0.00 | 0.00 |
| RO(*Note 1) | 14.01 | 12.06 | 15.38 | 14.42 | 12.91 | 13.76 |
| ZnO | 2.78 | 2.84 | 2.74 | 2.77 | 2.83 | 2.83 |
| $ZrO_2$ | 7.24 | 7.41 | 7.13 | 7.21 | 6.67 | 5.94 |
| $Al_2O_3$ | 0.00 | 0.00 | 0.00 | 0.00 | 0.00 | 0.00 |
| $Gd_2O_3$ | 0.00 | 0.00 | 0.00 | 0.00 | 0.00 | 0.00 |
| $Y_2O_3$ | 0.00 | 0.00 | 0.00 | 0.00 | 0.00 | 0.00 |
| $Yb_2O_3$ | 0.00 | 0.00 | 0.00 | 0.00 | 0.00 | 0.00 |
| $Ta_2O_5$ | 0.00 | 0.00 | 0.00 | 0.00 | 0.00 | 0.00 |
| $Bi_2O_3$ | 0.00 | 0.00 | 0.00 | 0.00 | 0.00 | 0.00 |
| $GeO_2$ | 0.00 | 0.00 | 0.00 | 0.00 | 0.00 | 0.00 |
| $Sb_2O_3$ | 0.00 | 0.00 | 0.00 | 0.00 | 0.00 | 0.00 |
| $SnO_2$ | 0.00 | 0.00 | 0.00 | 0.00 | 0.00 | 0.00 |
| Total | 100.00 | 100.00 | 100.00 | 100.00 | 100.00 | 100.00 |
| $B_2O_3/SiO_2$ | 1.99 | 1.98 | 1.98 | 1.99 | 1.98 | 1.97 |
| CaO/BaO | 0.16 | 0.37 | 0 | 0 | 0.34 | 0.31 |
| SrO/BaO | 0 | 0 | 0.29 | 0.69 | 0 | 0 |
| $n_d$ | 1.90384 | 1.90488 | 1.90276 | 1.90271 | 1.90296 | 1.90059 |
| $v_d$ | 31.3 | 31.18 | 31.32 | 31.33 | 31.27 | 31.39 |
| $T_g$ [° C.] | 650 | 652 | 650 | 654 | 651 | 651 |
| $T_S$ [° C.] | 699 | 698 | 699 | 701 | 697 | 697 |
| Density(*Note 2) | 4.54 | 4.49 | 4.59 | 4.57 | 4.49 | 4.49 |
| Kinematic viscosity $[10^{-4} m^2/s]$ | — | 1.31 | 1.12 | — | — | — |

TABLE 1-1-continued

| | Wt. % | | | | | |
|---|---|---|---|---|---|---|
| | 1 | 2 | 3 | 4 | 5 | 6 |
| $\lambda_{80}$ [nm] | 467 | 468 | 489 | 484 | 491 | 481 |
| $\lambda_{70}$ [nm] | 405 | 407 | 410 | 410 | 405 | 401 |
| $\lambda_{5}$ [nm] | 358 | 359 | 358 | 358 | 359 | 358 |

(*Note 1)
RO represents a total content of BaO, CaO, SrO and MgO.
(*Note 2)
Density at room temperature, and unit = [g/cm$^3$]

TABLE 1-2

| | Wt. % | | | | | |
|---|---|---|---|---|---|---|
| | 7 | 8 | 9 | 10 | 11 | 12 |
| $SiO_2$ | 6.83 | 6.85 | 6.76 | 6.80 | 6.84 | 6.87 |
| $B_2O_3$ | 13.52 | 13.52 | 13.42 | 13.50 | 13.58 | 13.65 |
| $La_2O_3$ | 37.47 | 37.74 | 36.91 | 37.11 | 37.33 | 37.54 |
| $Nb_2O_5$ | 5.52 | 5.53 | 5.46 | 5.49 | 5.52 | 5.55 |
| $TiO_2$ | 12.95 | 12.98 | 12.81 | 12.88 | 12.96 | 13.03 |
| BaO | 12.12 | 12.15 | 11.99 | 10.32 | 10.34 | 8.67 |
| CaO | 2.24 | 2.57 | 0.96 | 0.96 | 1.63 | 1.63 |
| SrO | 0.00 | 0.00 | 1.74 | 2.94 | 1.74 | 2.94 |
| MgO | 0.00 | 0.00 | 0.00 | 0.00 | 0.00 | 0.00 |
| RO(*Note 1) | 14.36 | 14.72 | 14.69 | 14.22 | 13.71 | 13.24 |
| ZnO | 2.79 | 2.79 | 2.76 | 2.77 | 2.79 | 2.81 |
| $ZrO_2$ | 6.56 | 5.87 | 7.19 | 7.23 | 7.27 | 7.31 |
| $Al_2O_3$ | 0.00 | 0.00 | 0.00 | 0.00 | 0.00 | 0.00 |
| $Gd_2O_3$ | 0.00 | 0.00 | 0.00 | 0.00 | 0.00 | 0.00 |
| $Y_2O_3$ | 0.00 | 0.00 | 0.00 | 0.00 | 0.00 | 0.00 |
| $Yb_2O_3$ | 0.00 | 0.00 | 0.00 | 0.00 | 0.00 | 0.00 |
| $Ta_2O_5$ | 0.00 | 0.00 | 0.00 | 0.00 | 0.00 | 0.00 |
| $Bi_2O_3$ | 0.00 | 0.00 | 0.00 | 0.00 | 0.00 | 0.00 |
| $GeO_2$ | 0.00 | 0.00 | 0.00 | 0.00 | 0.00 | 0.00 |
| $Sb_2O_3$ | 0.00 | 0.00 | 0.00 | 0.00 | 0.00 | 0.00 |
| $SnO_2$ | 0.00 | 0.00 | 0.00 | 0.00 | 0.00 | 0.00 |
| Total | 100.00 | 100.00 | 100.00 | 100.00 | 100.00 | 100.00 |
| $B_2O_3/SiO_2$ | 1.98 | 1.97 | 1.99 | 1.99 | 1.99 | 1.99 |
| CaO/BaO | 0.18 | 0.21 | 0.08 | 0.09 | 0.16 | 0.19 |
| SrO/BaO | 0 | 0 | 0.15 | 0.28 | 0.17 | 0.34 |
| $n_d$ | 1.90185 | 1.89983 | 1.9033 | 1.903275 | 1.90382 | 1.90379 |
| $v_d$ | 31.36 | 31.46 | 31.31 | 31.315 | 31.25 | 31.255 |
| $T_g$ [° C.] | 650 | 650 | 650 | 652 | 651 | 653 |
| $T_S$ [° C.] | 696 | 696 | 699 | 700 | 698 | 699 |
| Density(*Note 2) | 4.53 | 4.52 | 4.57 | 4.56 | 4.54 | 4.53 |
| Kinematic viscosity [$10^{-4}$ m$^2$/s] | — | — | — | — | 1.09 | — |
| $\lambda_{80}$ [nm] | 490 | 489 | 478 | 476 | 479 | 476 |
| $\lambda_{70}$ [nm] | 405 | 404 | 408 | 408 | 409 | 409 |
| $\lambda_{5}$ [nm] | 358 | 358 | 358 | 358 | 359 | 359 |

(*Note 1)
RO represents a total content of BaO, CaO, SrO and MgO.
(*Note 2)
Density at room temperature, and unit = [g/cm3]

TABLE 1-3

| | Wt. % | |
|---|---|---|
| | 13 | 14 |
| $SiO_2$ | 7.95 | 6.85 |
| $B_2O_3$ | 12.42 | 13.52 |
| $La_2O_3$ | 37.74 | 37.74 |
| $Nb_2O_5$ | 5.53 | 5.53 |
| $TiO_2$ | 10.98 | 14.98 |
| BaO | 12.15 | 12.15 |
| CaO | 2.57 | 2.57 |
| SrO | 0.00 | 0.00 |
| MgO | 0.00 | 0.00 |
| RO(*Note 1) | 14.72 | 14.72 |
| ZnO | 4.79 | 0.79 |
| $ZrO_2$ | 5.87 | 5.87 |
| $Al_2O_3$ | 0.00 | 0.00 |
| $Gd_2O_3$ | 0.00 | 0.00 |
| $Y_2O_3$ | 0.00 | 0.00 |
| $Yb_2O_3$ | 0.00 | 0.00 |
| $Ta_2O_5$ | 0.00 | 0.00 |
| $Bi_2O_3$ | 0.00 | 0.00 |
| $GeO_2$ | 0.00 | 0.00 |
| $Sb_2O_3$ | 0.00 | 0.00 |
| $SnO_2$ | 0.00 | 0.00 |
| Total | 100.00 | 100.00 |
| $B_2O_3/SiO_2$ | 1.56 | 1.97 |
| CaO/BaO | 0.21 | 0.21 |
| SrO/BaO | 0 | 0 |
| $n_d$ | 1.87173 | 1.92693 |
| $v_d$ | 32.91 | 30.16 |
| $T_g$ [° C.] | 640 | 657 |
| $T_S$ [° C.] | 685 | 703 |
| Density(*Note 2) | 4.52 | 4.52 |
| Kinematic viscosity [$10^{-4}$ m$^2$/s] | — | — |
| $\lambda_{80}$ [nm] | 486 | 494 |
| $\lambda_{70}$ [nm] | 400 | 412 |
| $\lambda_5$ [nm] | 357 | 358 |

(*Note 1)
RO represents a total content of BaO, CaO, SrO and MgO.
(*Note 2)
Density at room temperature, and unit = [g/cm3]

INDUSTRIAL UTILITY

According to the present invention, there can be provided an optical glass having high light transmittance, a high refractive index and excellent production stability, a press-molding glass gob formed of the above optical glass, an optical part formed of the above optical glass, a process for producing a glass shaped material formed of the above optical glass and a process for producing an optical part formed of the above optical glass.

The invention claimed is:

1. An optical glass essentially free of PbO and comprising at least one of CaO and SrO together with $SiO_2$, $B_2O_3$, $La_2O_3$, $Nb_2O_5$, $TiO_2$ and BaO, having a composition that substantially contains, by weight %, 1 to 18% of $SiO_2$,
3 to 24% of $B_2O_3$, provided that the ratio of content of $B_2O_3$ to the content of $SiO_2$ ($B_2O_3/SiO_2$) is over 1,
10 to 50% of $La_2O_3$,
1 to 30% of $Nb_2O_5$,
1 to 30% of $TiO_2$,
over 6% but less than 13% of BaO,
less than 7% of CaO,
6% or less of SrO,
0 to 13% of MgO, provided that the total content of BaO, CaO, SrO and MgO is 40% or less,
0 to 15% of ZnO,
0 to 15% of $ZrO_2$,
0 to 10% of $Al_2O_3$,
0 to 20% of $Gd_2O_3$,
0% or more but less than 2% of $Y_2O_3$,
0 to 5% of $Yb_2O_3$,
0 to 18% of $Ta_2O_5$,
0 to 20% of $Bi_2O_3$,
0 to 10% of $GeO_2$,
0% or more but less than 2% of $Sb_2O_3$, and
0% or more but less than 2% of $SnO_2$,
and having a refractive index ($n_d$) of over 1.8, an Abbe's number ($v_d$) of 28 to 40 and a density of 4.2 g/cm$^3$ or more.

2. The optical glass of claim 1, wherein the ratio of the content of CaO to the content of BaO (CaO/BaO) is 2 or less and/or the ratio of the content of SrO to the content of BaO (SrO/BaO) is 2 or less.

3. The optical glass of claim 2, wherein the ratio of the content of CaO to the content of BaO (CaO/BaO) is from 0.1 to 2 and/or the ratio of the content of SrO to the content of BaO (SrO/BaO) is from 0.1 to 2.

4. The optical glass of claim 1, which has a refractive index ($n_d$) of over 1.86.

5. The optical glass of claim 1, which has a liquidus temperature and has a kinematic viscosity, measured at the liquidus temperature, of $0.70 \times 10^{-4}$ to $4.0 \times 10^{-4}$ m$^2$/s.

6. A press-molding glass gob formed of the optical glass of claim 1.

7. An optical part formed of the optical glass of claim 1.

8. A process for producing a glass shaped material, which comprises causing a refined and homogenized molten glass stored in a vessel to flow out of a pipe outlet and preparing a glass shaped material formed of the optical glass of claim 1.

9. A process for producing an optical part, which comprises the step of softening the press-molding glass gob of claim 6 under heat and press-molding the press-molding glass gob.

10. The optical glass of claim 1, wherein the content of BaO is 12.15% by weight or less.

11. The optical glass of claim 1, which contains no $GeO_2$.

12. The optical glass of claim 1, which has a coloring degree $\lambda_{70}$ of 430 nm or less and has an external transmittance of 70% or more in a wavelength region of $\lambda_{70}$ to 700 nm when the optical glass has a thickness of 10 mm.

* * * * *